DETACHABLE SUPPLEMENTARY DIAL FOR TELEPHONES

Filed June 14, 1954 2 Sheets-Sheet 1

INVENTOR.
RICHARD H.P. JUERST
BY
Pearson + Pearson
ATTORNEYS

DETACHABLE SUPPLEMENTARY DIAL FOR TELEPHONES

Filed June 14, 1954 2 Sheets-Sheet 2

INVENTOR.
RICHARD H.P. JUERST
BY
Pearson + Pearson
ATTORNEYS

United States Patent Office 2,798,318

Patented July 9, 1957

2,798,318

DETACHABLE SUPPLEMENTARY DIAL FOR TELEPHONES

Richard H. P. Juerst, Lowell, Mass.

Application June 14, 1954, Serial No. 436,648

8 Claims. (Cl. 40—10.5)

This invention relates to an improved device for supplementing the readability of dials on certain types of dial telephones.

It is well known that certain dial telephones now in use are provided with an apertured dialing ring with a dial therebelow and that the provision on the dial of letters in addition to a number under each aperture requires that the characters be quite small. Furthermore, it is necessary to peer into each aperture to read such characters and a person not directly facing the dial ring is unable to read the same.

I am aware that many patents have issued for detachable annular plates upon which enlarged dial characters are carried and which plates have been supported on the telephone by many different means. Sometimes such means have covered the original dial of the telephone or have relied for support on parts of the dial mechanism where they can be easily dislodged to interfere with proper dialing or have required actual changing of the telephone equipment itself and they have thus been subject to possible disapproval by telephone companies.

The principal object of this invention is to provide a supplementary dial plate with enlarged dialing characters capable of being attached to, and detached from a telephone without affecting the operation of the instrument in any way and without requiring the removal of the hand set from its base.

Another object of the invention is to provide a dial attachment which resiliently clamps over the portion of the base adjacent the dial mechanism of the telephone in the manner of a tight fitting skirt and has no direct connection to any part of the dialing mechanism except to encircle the dial.

A further object of the invention is to provide a rigid, character-bearing, annular plate supported by a rubber-like skirt snugly fitting over the front and sides of a telephone base, but having a rearward recess to accommodate the rear of the base and permit forward sliding attachment of the skirt.

Still another object of the invention is to provide an annular dial plate and a base-fitting supporting skirt therefor which is inexpensive, durable and attractive and which merely slides on and off the telephone instrument without removing the hand set.

Other objects and advantages of the device will be apparent from the accompanying drawing and description thereof wherein a preferred embodiment is illustrated.

Figures 1, 2:
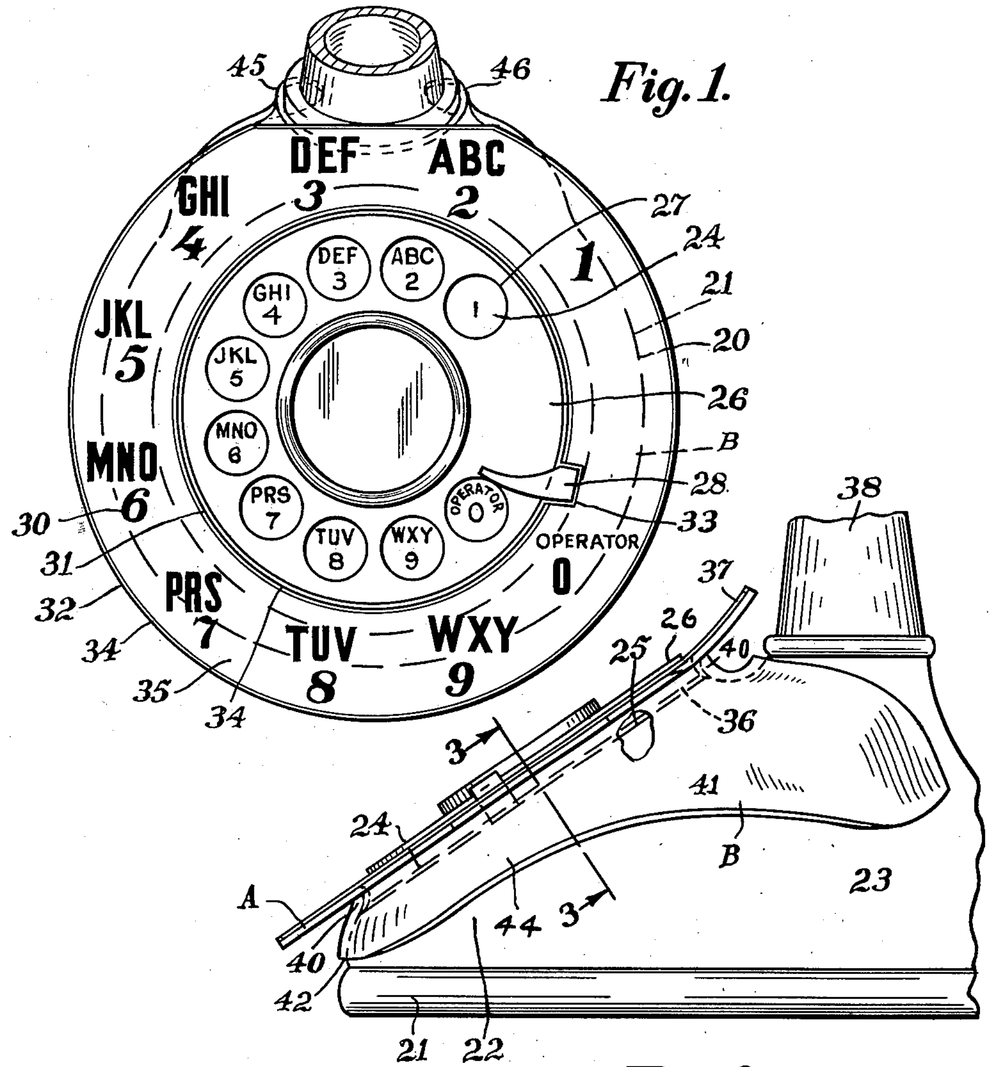
Fig. 1 is a view of the base portion of a typical round base telephone, looking perpendicularly at the dial ring thereof and with my device mounted thereon.
Fig. 2 is a side view of the device shown in Fig. 1.
Figure 3:
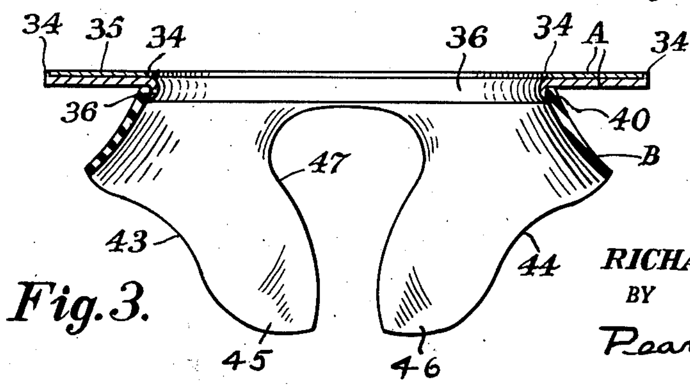
Fig. 3 is a front view in section on line 3—3 of Fig. 2 with the device removed from the telephone.

In Figs. 1–3 of the drawings, a dial telephone 20 is illustrated having a round base 21 with a forward dial-carrying portion 22 and a rearward post-carrying portion 23. In the particular type telephone 20 shown, the circular character bearing dial 24 of the telephone is set flush with the upper surface 25 of the base 21. However, in many dial telephones still in use, the dial such as 24 is raised about one quarter of an inch above the surface of the base. The device of this invention fits either of such telephones as will be apparent from the following description. Dial 24 is stationary and inclined upwardly and rearwardly, there being also a rotatably mounted dial ring 26 having finger apertures 27 mounted at a slightly higher level thereabove. A finger stop hook 28 is also provided and usually three letters and a numeral are printed on the dial beneath each of the apertures 27.

The device of this invention includes an annular character bearing plate A arranged to encircle a dial ring 24 of a telephone and mounted on a preformed, self supporting skirt B shaped to conform to the shape of a telephone base adjacent the dial thereof and to overlie the same. Plate A is provided with enlarged characters 30 corresponding to the position of the characters on the dial and located between the inner periphery 31 and the outer periphery 32 thereof. The inner circular periphery 31 of plate A is of a diameter slightly larger than the diameter of a dial ring 24, to fit thereover without touching and is also provided with a cutout recess 33 to accommodate a finger stop hook 28. Preferably, plate A is of rigid material with the characters 30 in a light color such as white to contrast with a darker background color such as black. The plate A may be of thin sheet metal with an annular groove 34 around the flat upper surface in which a paper ring 35 is inset, the characters 30 being printed on the paper ring 35. Preferably also, plate A includes a downwardly depending outwardly flared curved flange 36, below the inner periphery 31, the flange 36 being of less height than the height of a dial ring 26 above a dial 24 on a typical telephone. In its preferred form, a section 37 of the circumferential surface of plate A is bent upwardly out of the plane of the plate in order to clear the post 38 of a telephone and for increased visibility.

The skirt B is preferably of resilient, yielding material such as rubber in order that it will not scratch the telephone base but at the same time will cling to the front and side faces thereof adjacent the dial mechanism with considerable inherent friction. As shown, skirt B preferably includes an annular flange 40 preferably curved at least on its inner surface to conform to and fit within the plate flange 36. Since the material of skirt B is resilient, the flange 40 may be expanded and slipped over flange 36 and will thereafter tightly hold and support plate A until it is removed in a similar manner. Flange 40 constitutes the upper portion of skirt B and the lower portion 41 conforms in inside shape to the exterior shape of the telephone base proximate the dial mechanism. Portion 41 includes a curved forward wall 42 and a pair of opposite side walls 43 and 44 curved to slide over and snugly overlie the forward portion 22 of a telephone base 21, adjacent the dial, the walls 43 and 44 being extended rearwardly only partially around the post 38 as at 45 and 46. An inverted pear shaped recess 47 is thus formed between extensions 45 and 46, and extensions 45 and 46 tend to resiliently clamp around post 38 when skirt B is in place to act as an additional retaining means therefor.

In Figs. 4–7 the invention is shown mounted on a telephone 50 having a square base 51, a stationary flush dial 52, a movable dial ring 53 and a stop hook 54. The dial plate 56 is similar to plate A and provided with enlarged characters 57 and an integral flange 58 depending downwardly from the inner periphery 59 thereof. Plate 56 is also of rigid material and bent upwardly in the section 60 to clear the hand instrument receiving posts 61. The skirt 63, is similar to skirt B and is also preferably of resilient yielding, rubber-like material to frictionally engage the portion of the telephone base immediately adjacent the dial mechanism when slid into overlying relation thereto. Skirt 63 includes an annular flange 64, in its upper portion, fitting around plate flange 58 and retaining the plate 56 on the skirt. The lower portion 65 of skirt 63 also includes a forward wall 66 and a pair of opposite side walls 67 and 68 all having an inside shape conforming to the exterior shape of the corresponding portions of the base 51 adjacent the dial. Walls 67 and 68 includes extensions 69 and 70, which extend rearwardly into the rearward portion of base 51 but which do not meet and thus define therebetween a recess 71 for accommodating said rearward portion.

Figures 4, 5, 6, 7, 8:
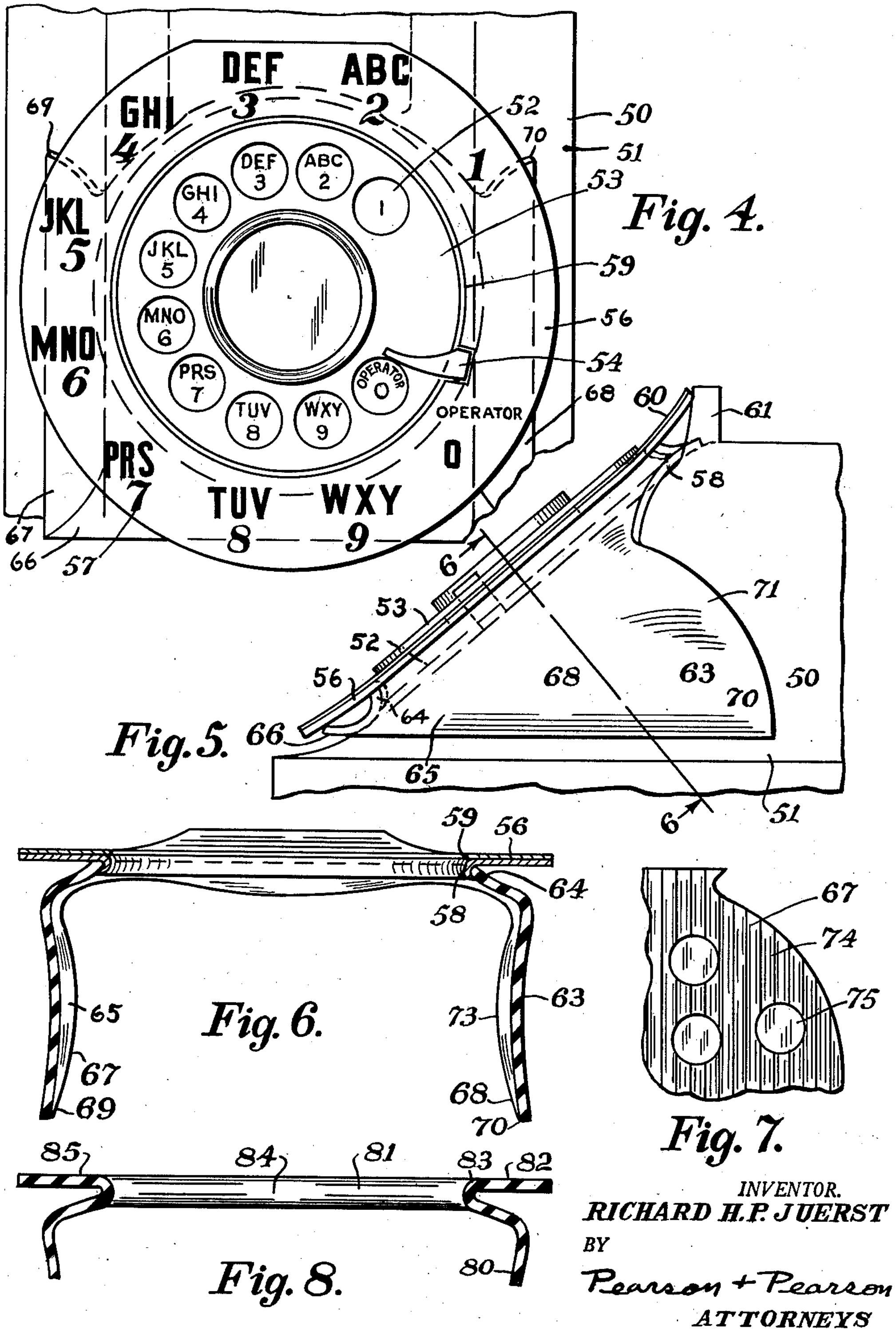
Fig. 4 is a view similar to Fig. 1 of the device constructed to conform to the shape of a square based telephone.
Fig. 5 is a side view of the device shown in Fig. 4.
Fig. 6 is a view in section on line 6—6 of Fig. 5 of the device removed from the telephone.
Fig. 7 is a fragmentary side view of the inside surface of the device shown in Figs. 4–6 with additional friction means incorporated therein.
Fig. 8 is a fragmentary view similar to Fig. 6 showing the device made of one piece of material.

As best shown in Fig. 6 the walls 67 and 68 may be preformed with a concave cross section as at 73 whereby pressure against the base 51 will cause them to straighten. Similarly, the skirts B or 63 may be preformed slightly smaller than necessary in order to fit more tightly over a telephone base, on the exterior faces thereof proximate the dial mechanism. In addition, as indicated in Fig. 7, the inside surface of the side walls such as 67 and 68 may be provided with vertical corrugations 74 or recesses 75 forming suction cups if desired to increase the grip of the skirt on the dial section of the telephone base.

As indicated in Fig. 8, the plate and skirt of the invention may be formed from one piece of material as by molding. The skirt 80, conforms in interior shape to the exterior shape of a telephone base such as 51, in the area adjacent the dial mechanism and slidably embraces the same when installed. Skirt 80 is provided with a first integral, annular flange 81 which is upstanding therefrom and a second integral annular flange 82 extends outwardly from the rim 83 of flange 81. The flanges 81 and 82 define a circular hole 84 for encircling the stationary dial or the movable dialing ring of a telephone and the inner periphery thereof fits over the dialing ring without touching the same. It will be apparent that enlarged characters corresponding to the characters on a dial may be formed in the material of the upper surface 85 of flange 82 or may be applied to a separate ring by printing or otherwise and the ring adhered to surface 85 or otherwise attached thereto.

It should be noted that the indicia carrying plate of the invention is supported in the plane of the dial ring without touching the same and that the inner periphery thereof is supported entirely around its circumference directly on the portion of the base of the telephone immediately adjacent the dial mechanism. Thus there is little risk of tipping or tilting the plate and skirt during use of the phone thereby causing the inner periphery of the plate to bear against the rotatable dial ring and slowing down the return rotation of the dial ring. In addition the supporting skirt of this invention, is substantially hidden under the plate, when viewing the telephone from above and from the front and the device can be slipped on and off the telephone without removing the hand set.

Certain changes in the details of the construction of the device may be made without departing from the spirit or scope of the invention.

I claim:

1. A device for use with telephones of the type having a base with a rotatable dialing ring spaced above a stationary, character carrying dial, said device comprising an annular plate having a free outer periphery and an inner periphery slightly larger than the outer periphery of the dialing ring to fit thereover, and having enlarged characters thereon corresponding to the characters of the stationary dial, and a preformed, self supporting skirt of resilient material extending downwardly from entirely around the inner periphery of said plate, said skirt conforming in interior shape to the exterior shape of the front and side face areas, adjacent the dial mechanism of a telephone base at a level above the level of the bottom of the base for slidably engaging and resiliently clamping on the said front and side faces of the telephone base to support said plate thereon.

2. A device as specified in claim 1 wherein said plate is of rigid material with an integral annular flange depending downwardly and flaring outwardly from its inner periphery and said preformed self supporting skirt is a separable element of resilient, yielding material with an annular flange entirely therearound and adopted to removably seat and engage around said plate flange.

3. A device as specified in claim 1 wherein said skirt includes continuous, imperforate forward and side walls, shaped to snugly fit over the forward and side face areas adjacent the dial of a telephone base, the rearward, terminal ends of said side walls forming an opening therebetween for receiving a telephone base.

4. A device as specified in claim 1 plus a plurality of substantially vertical corrugations on the inside surface of said skirt for frictionally engaging the exterior surface of a telephone base.

5. A device as specified in claim 1 plus suction cup means on the inside surface of said skirt for retaining said skirt on a telephone base.

6. A device for use with dial telephones, said device comprising an annular plate of rigid material adapted to fit over the dialing ring of a telephone, said plate having enlarged dial characters therearound and an intergral, outwardly flared annular flange depending from the inner periphery thereof and a preformed self supporting skirt of resilient, yieldable material, said skirt having an annular flange around its upper portion, resiliently engaged around said plate flange and having a forward wall and a pair of opposite side walls extending downwardly from said upper portion and adapted to slidably embrace the forward and side faces of a telephone base adjacent the dial mechanism thereof for supporting said plate at a level proximate the level of the dial on a telephone.

7. A device as specified in claim 6 wherein said skirt is of soft rubber and recesses are provided in the inside surface of said side walls for forming suction cups.

8. A device for use with telephones of the type having a base with a rotatable dialing ring spaced above a stationary character carrying dial, said device comprising a preformed, self supporting skirt conforming in interior shape to the exterior shape of a telephone base in the area at the front and sides of a telephone dial and adapted to be detachably supported thereon; a first integral annular flange upstanding from said skirt and adapted to encircle the dialing ring of a telephone with close clearance from the ring periphery and a second integral annular flange, extending outwardly from the upper rim of said first flange at substantially right angles thereto, said second flange being adapted to carry enlarged characters corresponding to the characters on a stationary dial.

References Cited in the file of this patent

UNITED STATES PATENTS

| | | |
|---|---|---|
| 1,535,490 | Long | Apr. 28, 1925 |
| 1,541,786 | Burgess | June 16, 1925 |
| 2,676,427 | Martindale | Apr. 27, 1954 |

FOREIGN PATENTS

| | | |
|---|---|---|
| 458,713 | Great Britain | Dec. 24, 1936 |